T. J. LOVETT.
ORE TREATMENT.
APPLICATION FILED OCT. 31, 1910.
994,472.
Patented June 6, 1911.
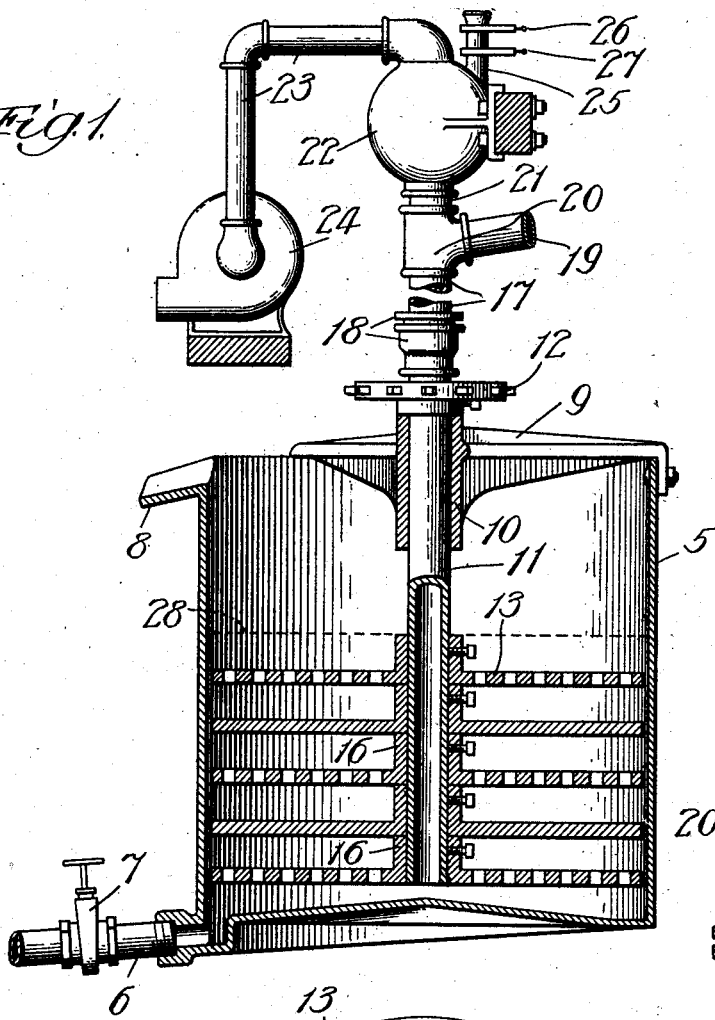
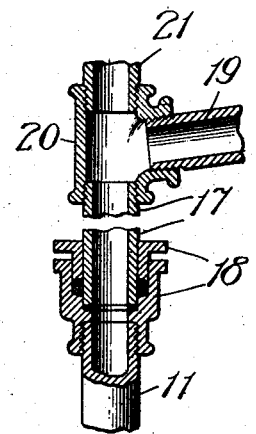
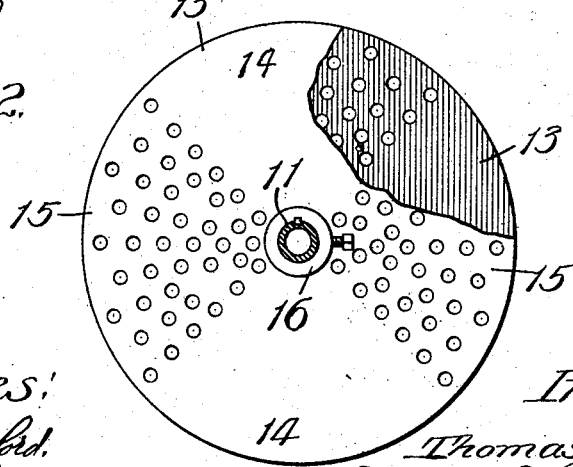
Witnesses:
Inventor:
Thomas J. Lovett,
By Dyrenforth, Lee, Chritton & Wiles,
Attys.

UNITED STATES PATENT OFFICE.

THOMAS J. LOVETT, OF CHICAGO, ILLINOIS.

ORE TREATMENT.

994,472.   Specification of Letters Patent.   Patented June 6, 1911.

Application filed October 31, 1910. Serial No. 589,962.

*To all whom it may concern:*

Be it known that I, THOMAS J. LOVETT, a citizen of the United States, residing at Chicago, in the county of Cook and State of Illinois, have invented a new and useful Improvement in Ore Treatment, of which the following is a specification.

This invention relates to the novel and improved treatment of a certain hard ore, or alluvial deposit, which disintegrates readily under the action of water and consists essentially of aluminum silicate and gypsum, more or less associated with decomposed sandstone and other silicious material, all in finely-divided condition, the ore carrying minute and widely disseminated particles of native mercury as well as gold and other metal values. So far as I am aware, ore of this character exists only in one region in the United States, and a vast, plainly exposed, deposit thereof has been widely known, for the past thirty years or more, to contain an average value of about fifty cents per cubic yard in gold. The foul state of the native mercury, the presence of the gypsum and the exceeding fineness and disseminated condition of the gold particles have seemingly presented obstacles to working the ore at a profit, to overcome which numerous attempts by miners have invariably resulted in failure for want of a suitable treatment applicable to the peculiar character of this ore. I have discovered that all these obstacles may be overcome by a treatment which is thoroughly practical and economical, resulting in the saving of approximately all the metallic values in the ore. The treatment referred to consists in the disintegration of the ore with water, to thoroughly break down the gypsum bond, then passing the ore, mixed with water sufficient to hold the particles of ore in a more or less segregated condition, into contact with clean, or healthy, metallic mercury, thereby causing the latter to abstract the mercury of the ore and absorb or retain the same, with any incorporated metallic values, dissociated from the gangue or non-metallic constituents of the ore. In order that the contact between the ore particles and clean mercury may be sufficiently intimate and prolonged to effect the best results, I prefer to pass the ore particles in, as far as practical, a segregated condition upwardly through a body or bath of fresh mercury, so that, furthermore, the gangue in rising to the top of the bath may be readily drawn off. The ore mixed with water is fed, under a necessary head of pressure, into the lower part of the bath and is staggered, baffled or agitated as it rises to prevent its establishing channels through the bath and to insure intimate contact between all the ore particles and the healthy mercury. To maintain the bath in a healthy condition and insure the ready absorption thereby of the mercury of the ore, I prefer to subject the bath to the cleansing or rejuvenating action of a suitable agent, such as sodium, which action may be brought about, for example, by injecting into the bath at intervals, as desired, a sufficient quantity of sodium amalgam. I have found that this reagent also purifies the native mercury contained in the ore. To reduce the tendency of the mercury bath to foul in operation I prefer to withdraw all air, as far as possible, from the mixture of ore and water before it is fed into the bath.

In the accompanying drawing I show, for purposes of illustration, the apparatus which I have devised for practicing my method on a commercial scale.

Figure 1 is a view of the apparatus which is shown partly in section and partly in elevation; Fig. 2, a view illustrating the construction of the baffling-disks employed in the apparatus; and Fig. 3, a section of the ore-feeding pipe.

The numeral 5 designates a metal tank provided at its lower end with a draw-off pipe 6 having a gate-valve 7 and provided at its upper end with an overflow spout 8. Secured to the top of the tank and extending across the same is a frame 9 formed with a bearing-sleeve 10 at the center of the tank. Extending through the sleeve is a vertical feed-pipe 11 terminating at its lower end just above the base of the tank and provided at its upper end with a drive-wheel 12 which may be a sprocket-wheel to be driven by a chain not shown. Secured to the pipe 11 is a series of horizontal disks 13 having diametrically opposed imperforate surfaces 14 separated by diametrically opposed perforated surfaces 15. The disks are secured to the hollow shaft or pipe 11 to rotate therewith and overlie each other in staggered relation: that is to say, the perforated sections of one disk are in the vertical plane of the imperforate sections of the adjacent disk or disks, the disks being spaced from each other by means of their hubs 16, as indicated. Above and communicating with the pipe 11 is a stationary stand-pipe 17, the pipes being secured together by a coupling 18 which permits the pipe 11 to rotate freely. Extending to the pipe 17 is a supply-pipe 19 and above the coupling 20, which joins the pipe 19 to the pipe 17, is a pipe 21 surmounted by a hollow sphere 22 forming an air-chamber connected by means of the pipe 23 with a suction-fan 24. Extending into the top of the sphere 22 is a tube 25 provided with an upper slide or gate-valve 26 and lower slide or gate-valve 27.

In practice, the tank 5 is filled, say, to the level of the dotted line 28, with metallic mercury to form a mercury bath. The finely-divided ore carrying the mercury and any metallic values incorporated with or amalgamated by the same, and mixed with water sufficient to hold the ore particles more or less in suspension, is fed by suitable means into the pipe 19 and caused to flow into the pipes 17 and 11. The pipe 11 and disks 13 carried thereby are rotated at comparatively slow speed and the ore enters the tank through the lower end of the pipe 11 under sufficient hydrostatic pressure, due to the height above the tank of the pipe 19, to force the ore upward through the bath and out at the overflow spout 8. The staggered relation of the perforated sections and the rotation of the disks cause the bath and the ore rising through it to be agitated, while the disks also tend to retard the upward progress of the ore, all with the result that the ore particles throughout are caused, at one time or another, to be brought into intimate contact with the fresh mercury. This close contact results in the absorption by the mercury of the bath of the mercury in the ore and, of course, any metallic values carried thereby.

The suction-fan 24 draws air from the chamber 22 and the partial vacuum thus created extracts the free air from the incoming ore-mixture. This prevents, to a large extent at least, the entrance of air with the ore into the bath and the consequent oxidizing effect which the air would have thereon. For the purpose of maintaining the bath in a healthy condition, sodium amalgam in the form of pills may be dropped occasionally as required into the tube 25 to fall through the chamber 20 and pipes 21, 17 and 11 into the lower part of the bath with the ore. From time to time a portion or all of the bath may be withdrawn through the pipe 6 and, when necessary, a fresh mercury bath may be provided or fresh mercury may be poured into the bath, all as may be required or considered expedient in operation.

What I regard as new and desire to secure by Letters Patent is—

1. The process of treating ore, consisting in suspending in water ore containing native mercury and other amalgamable values, exhausting the air from said mixture, submerging said mixture in and commingling it with a relatively large bulk of healthy mercury, and while said ore is rising through said healthy mercury directing the values carried thereby into intimate contact with said healthy mercury and thereby intercepting the same therein, while causing the other constituents of the ore to rise therethrough.

2. The process of treating ore, consisting in mixing with water ore containing native mercury and other amalgamable values, submerging said mixture in and commingling it with a relatively large bulk of healthy mercury and during such treatment introducing into the mass a reagent adapted to render amalgamable the native mercury of said ore.

THOMAS J. LOVETT.

In presence of—
L. HEISLAR,
R. SCHAEFER.

---

Copies of this patent may be obtained for five cents each, by addressing the "Commissioner of Patents, Washington, D. C."